(12) United States Patent
Harrison et al.

(10) Patent No.: US 6,278,921 B1
(45) Date of Patent: Aug. 21, 2001

(54) TRANSFERRING ACCUMULATED DATA FROM VEHICLES

(75) Inventors: Christopher G. Harrison, Manchester; Jeffrey C. Morris, Leeds, both of (GB)

(73) Assignee: Minorplanet Limited, West Yorkshire (GB)

( * ) Notice: Subject to any disclaimer, the term of this patent is extended or adjusted under 35 U.S.C. 154(b) by 0 days.

(21) Appl. No.: 09/254,880

(22) PCT Filed: Sep. 16, 1997

(86) PCT No.: PCT/GB97/02519

§ 371 Date: Jun. 9, 1999

§ 102(e) Date: Jun. 9, 1999

(87) PCT Pub. No.: WO98/11513

PCT Pub. Date: Mar. 19, 1998

(30) Foreign Application Priority Data

Sep. 16, 1996 (GB) .................................... 9619315
Jul. 11, 1997 (GB) .................................... 9714592

(51) Int. Cl.[7] .............................. G06F 7/00; G06F 17/00; G06F 19/00
(52) U.S. Cl. ............................ 701/35; 701/33; 455/12.1; 455/427; 455/428; 455/425; 340/426; 340/428; 340/430; 370/345; 370/347; 370/348; 370/346; 370/350
(58) Field of Search ...................... 701/35, 33; 455/12.1, 455/427, 428, 425; 340/426, 428, 430; 370/345, 347, 348, 346, 350

(56) References Cited

U.S. PATENT DOCUMENTS

| | | | |
|---|---|---|---|
| 4,573,207 | * | 2/1986 | Smith et al. ............................ 455/54 |
| 4,672,608 | * | 6/1987 | Ball et al. ............................... 370/93 |
| 5,737,330 | * | 4/1998 | Fulthorp et al. ...................... 370/346 |
| 5,874,889 | * | 2/1999 | Higdon et al. ....................... 340/426 |
| 5,926,745 | * | 7/1999 | Threadgill et al. ................. 455/12.1 |
| 6,006,148 | * | 12/1999 | Strong .................................. 701/33 |

FOREIGN PATENT DOCUMENTS

| | | |
|---|---|---|
| 0239066 | 9/1987 | (EP) . |
| 0 239 066 | 9/1987 | (EP) . |
| 2255665A | 11/1992 | (GB) . |
| 2261977A | 6/1993 | (GB) . |
| 2288892A | 11/1995 | (GB) . |
| 2 288 892 A | 11/1995 | (GB) . |
| 90 09645 A | 8/1990 | (WO) . |
| WO 90/09645 | 8/1990 | (WO) . |
| 94 07225 A | 3/1994 | (WO) . |
| WO 94/07225 | 3/1994 | (WO) . |
| WO 97/04421 | 2/1997 | (WO) . |

* cited by examiner

Primary Examiner—William A. Cuchlinski, Jr.
Assistant Examiner—Ronnie Mancho
(74) Attorney, Agent, or Firm—Nixon & Vanderhye P.C.

(57) ABSTRACT

The transferring of accumulated data from a plurality of vehicles to a data processing station involves transmitting a first packet type request from each vehicle via an open radio channel in response to a predetermined operation. The predeterminedn operation may include the vehicle's ignition being turned off. The first packet type is detected at a receiving station if a transmitting vehicle is within the vicinity of the receiving station. The receiving station transmits an instruction for data in the form of a second packet type upon detecting a first packet type. Thereafter, a portion of the accumulated data is transmitted from a detected vehicle in response to instructions generated by the receiving station.

36 Claims, 15 Drawing Sheets

| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| DATE (701) | Y | Y | Y | Y | Y | Y | Y | Y | M | M | M | M | D | D | D | D | D | 1 | 0 | 0 | 0 | 0 | 0 | 0 |
| START TIME (702) | S | S | S | S | S | S | M | M | M | M | M | M | H | H | H | H | H | 1 | 1 | 0 | 0 | 0 | 0 | 0 |
| STOP TIME (703) | S | S | S | S | S | S | M | M | M | M | M | M | H | H | H | H | H | 0 | 1 | 0 | 0 | 0 | 0 | 0 |
| ABSOLUTE LATITUDE (704) | T | T | T | T | T | T | T | T | T | T | T | T | T | T | T | T | T | T | T | T | T | T | 0 | 1 |
| ABSOLUTE LONGITUDE (705) | G | G | G | G | G | G | G | G | G | G | G | G | G | G | G | G | G | G | G | G | G | G | 1 | 1 |
| RELATIVE LAT/LONG (706) | G | G | G | G | G | G | G | G | G | G | G | T | T | T | T | T | T | T | T | T | T | T | 1 | 0 |

| ACCUMULATION DEVICE ADDRESS 1501 | SAFE FILE NAME 1502 | TIMESTAMP 1503 |
|---|---|---|
| $A_0$ | L:\SAFE\NAME1 | M : S : 00 |
| $A_1$ | L:\SAFE\NAME2 | M : S : 00 |
| $A_2$ | L:\SAFE\NAME3 | M : S : 00 |
| $A_3$ | L:\SAFE\NAME4 | M : S : 00 |
|  |  |  |

TRANSFERRING ACCUMULATED DATA FROM VEHICLES

The present invention relates to transferring accumulated data from a plurality of vehicles to a data processing station.

Introduction

Systems for transferring accumulated data from vehicles to a data processing station are known and an example is illustrated in international patent publication WO 90/09645. This publication details a system in which sensors on each vehicle continuously monitor sensed parameters, whereafter a record is made in a data store under the control of a processing unit. The sensed data may include road speed, engine speed, distance travelled, fuel consumption, cylinder head temperature, exhaust gas temperature, engine and transmission oil pressures and water temperature. The recorded data is transmitted by radio to a base-station as desired. The data may be transmitted automatically from each vehicle at regular intervals of time or, alternatively, the data may be transmitted when called or polled by a base-station and in a described preferred embodiment, the vehicles are polled in turn on demand or at regular intervals. The data, therefore, may be transmitted by radio to the base-station while the vehicle is on the road and, essentially, remote from said base-station.

A disadvantage of this known system is that a sophisticated radio network is required in order to facilitate the transfer of data. In many practical realisations, the cost of establishing such a network would outweigh any commercial advantages given by the monitoring system.

A hazardous waste shipment system is described in international patent publication number WO 94/07225. The system provides monitoring control to verify the location and condition of each shipment. Two-way base stations receive status and identification signals from vehicle-mounted transponders as the shipments pass by and these base stations relay the information to a central databank. The vehicle-mounted transponders may receive data from sensors that monitor the load and may actuate alarms or a message display for operator intervention. Notifications and safety instructions are also provided in the event of a mishap and the base station may relay instructions or route changes to the vehicle-mounted transponders.

For the transportation of hazardous waste, a sophisticated real-time transmission environment may be justified, given the potential problems that may arise if anything goes wrong. However, in many environments, such a sophisticated radio system could not be justified and the provision of a network of base stations would tend to be restricted to particular preferred routes.

A solution to the cost of establishing a radio network of the type required in the aforesaid known system is put forward in the United Kingdom patent publication number 2 288 892. In this system, it is proposed to transfer data using existing cellular telephony networks which facilitate the transmission of data an regular intervals. Consequently, a system of this type allows the transmission of data in real-time such that, on a sample-by-sample basis, the base-station receives information which may include fuel consumption, global positioning and related parameters assisting in the management of a fleet.

A system of this type is technically very attractive in that, at any point in time, it is possible to establish the position of all vehicles in the fleet. However, when this information is transmitted, it is necessary to effect a telephone call over a cellular or satellite radio network which, if samples are obtained at regular intervals would again significantly add to the cost of operating the system. Consequently, using a system of this type, it is likely that samples would be obtained after relatively long periods thereby significantly reducing the operational resolution.

A method of transferring accumulated data is described in European Patent Publication No 0 239 066. This proposal avoids the necessity for radio communications by accumulating data and transferring the accumulated data in non-real time. The transfer is made by storing the data in a removable device, preferably taking the form of a key-fob. Thus, as a key is removed from an operational vehicle, the data associated with that vehicle is transferred with the key, thereby allowing the data to be downloaded into a processing environment.

A problem with this known approach is that it requires the physical transfer of a device in order for the accumulated data to be downloaded. The physical size of the device will restrict the amount of data which may be accumulated in this way and data loss may also become a problem, given that the device must carry its own source of power. Furthermore, the device must be robust and requires specific activities to be performed on the part of drivers and other operators in order for the data to be collected.

SUMMARY OF THE INVENTION

According to a first aspect of the present invention, there is provided a method of transferring accumulated data from a plurality of vehicles to a data processing station, comprising steps of transmitting a first packet type from each vehicle via an open radio channel in response to a predetermined operation; detecting said first packet type at a receiving station if a transmitting vehicle is within the vicinity of said receiving station; transmitting a request for data in the form of a second packet type from said receiving station upon detecting said first packet type; and transmitting a portion of said accumulated data from a detected vehicle in response to said request.

An open radio channel is one in which radio transmissions may be made without obtaining licenses and without using fee-incurring service providers. Proprietary equipment is available for use within these channels, operating at specified bandwidths and it is appreciated that the range of operation is relatively limited. Thus, a transfer of data only takes place when a vehicle is within the vicinity of the receiving station. A plurality of vehicles may download data in a multiplexed way. Only portions of the accumulated data are transmitted so that any one vehicle is only given access to the available bandwidth for relatively short bursts. Furthermore, the transmission of data from a vehicle to the receiving station is only possible after receiving an instruction to transmit data from the receiving station. Preferably, the accumulated data represents vehicle positions and said positional data may be derived by receiving radio signals from satellites.

According to a second aspect of the present invention, there is provided apparatus for accumulating data from a vehicle and for transferring said accumulated data to a data processing station, comprising means for transmitting a first packet type over an open radio channel to request transmission of accumulated data; means for receiving an instruction in the form of a second packet type from a receiving station if the transmitter is within the vicinity of said receiving station; and transmitting a portion of said accumulated data in response to said received instruction.

Preferably, means are included for initiating a transmission in response to the ignition of the vehicle being turned off. Furthermore, means are preferably provided for accumulating position information in response to the vehicle ignition being turned on.

In a preferred embodiment means are provided for transmitting said packet type after a relatively random period so as to minimise the risk of vehicles transmitting data at the same time. Preferably, the apparatus includes means for detecting whether a radio channel is available prior to transmitting a packet of data.

According to a third aspect of the present invention, there is provided a receiving station for receiving accumulated data from a plurality of vehicles, comprising means for receiving a first packet type request from each vehicle via an open radio channel; transmitting means for transmitting an instruction for data in the form of a second packet type upon detecting said first packet type; and wherein said receiving means is arranged to receive portions of said accumulated data from detected vehicles in response to said instructions.

In a preferred embodiment, the apparatus includes means for detecting whether a radio channel is available prior to transmitting instructions. Preferably, the apparatus includes means for identifying new unique addresses within received packets.

In a preferred embodiment, the apparatus includes means for prioritising the accumulation of data from a plurality of accumulation devices and said prioritising means may include means for giving priority to accumulation device having relatively full memories.

BRIEF DESCRIPTION OF THE DRAWINGS

FIG. 7 illustrates the formatting of data accumulated by the data accumulation device shown in FIG. 5;

DETAILED DESCRIPTION OF THE PREFERRED EMBODIMENTS

The invention will now be described by way of example only with reference to the previously identified drawings.

It is has been appreciated for some time that the efficiency with which fleets of vehicles are operated may be enhanced if information about the vehicles may be collected and processed, so as to facilitate planning and fleet management and also to ensure that vehicles and their drivers are operating as intended. Ideally, it would be preferable to continually relay information back from vehicles to a central system so that information is instantaneously available in real-time concerning parameters of interest. However, the infrastructure resources required in order to achieve this would often far outweigh any financial advantages gained from an analysis of the information so obtained. Thus, for example, an instantaneous real-time system is capable of identifying where vehicles are. However, in many practical realisations, an operator is more concerned as to where the vehicles have been. Consequently, the present embodiment is concerned with the transfer of accumulated data from a plurality of vehicles for subsequent analysis.

The preferred embodiment is directed towards the accumulation of positional information derived from global positioning satellites, for which proprietary detection equipment is readily available. However, it should be appreciated that other types of data may be collected and the particular data sets accumulated for subsequent downloading may be significantly dependent upon the type of work being performed by the vehicles. Thus, in addition to positional information, information may also be accumulated relating to the mechanical operation of the vehicle and the way in which the vehicle is being driven. In addition to this, user specific information may be included which, for example may relate very specifically to a particular emergency service, possibly identifying particular modes of operation for that service. Furthermore, systems of this type could be used to monitor the use of the particular roads, for example where tolls are required for using motorways, bridges and tunnels or when accessing particular urban areas.

It can be seen that, particularly in emergency environments, the information is considered to be of very high grade and therefore a relatively high cost may be paid to effect the transfer of this data. Similarly, much data may be seen as advantageous but can only be realistically processed if the information may be retrieved at modest cost and with little additional inconvenience to operators and drivers. Ideally, and as achieved by the preferred embodiment, the downloading of accumulated data is essentially transparent to vehicle operators and, in this way, does not hinder the professional activities of operators, while minimizing opportunities of mis-use.

Figure 1:
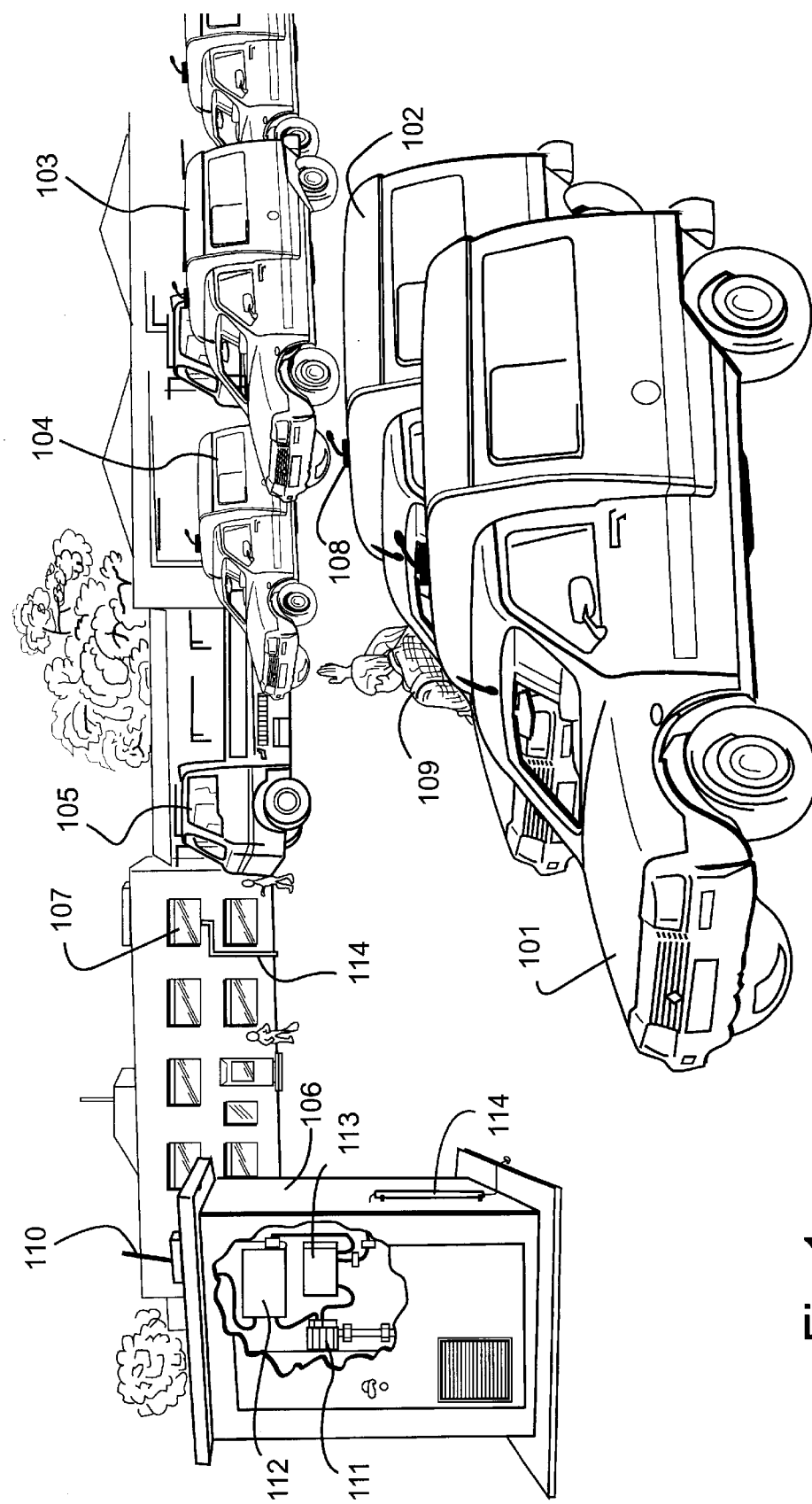
FIG. 1 shows a depot for commercial vehicles having a data processing station and a data collection point.

A depot for commercial vehicles is illustrated in FIG. 1, in which vehicles 101, 102, 103, 104 and 105 are examples of vehicles which have been temporarily parked, possibly overnight, while their drivers attend to other matters.

When vehicles are parked at designated areas within the depot, they are within the vicinity of a data collection point 106 and each vehicle, in response to a predetermined operation such as the vehicle ignition being turned off, will transmit a first packet type request in an attempt to establish radio communication with a data collection point 106.

The data collection point 106 communicates with a data processing station housed, in the example shown in FIG. 1, within office location 107 and a communication channel between data collection point 106 and the data processing station 107 is established, as appropriate, depending upon the distance between these two locations. In combination, the data collection point and the data processing station may be considered as a receiving station which may detect packets of the aforesaid first type, issued by a transmitting vehicle such that, in turn, they may transmit an instruction for data in the form of a second packet type. In response to receiving this second packet type, an addressed vehicle may transmit a portion of its accumulated data and this process may continue until a requesting vehicle has downloaded all of its accumulated data.

As illustrated in FIG. 1, situations arise in which many vehicles may wish to download accumulated data. This situation arises more often than one may imagine, given that, very often, vehicles will endeavour to reach a particular depot by a particular time, possibly a lunch time or an end of shift etc. Even when vehicles are covering relatively large distances, it is possible that their journey may originate from a first depot and terminate at a second depot. Again, even under these circumstances, it is highly probable that the arrival of vehicles, with accumulated data to transfer, will be relatively clustered such that, if the data transfer is to be successful, the receiving station must be capable of communicating and maintaining a conversation with many if not all of the vehicles over a period of time. Furthermore, it is appreciated that some vehicles may arrive at the depot for a relatively short period of time and, if their accumulated data is to be received, it is appreciated that transfers must not take too long. Vehicles may also move within the depot therefore procedures are required for re-establishing communications or establishing a new communication without ambiguity. Similarly, sophisticated procedures may be included for prioritising vehicles, possibly with large amounts of data to download so as, overall, all of the accumulated data is downloaded from the vehicles and the overall integrity of the system is maintained.

The global positioning satellite system depends upon twenty-four orbiting satellites of the NAVSTAR type space-based radio navigation system. The satellites are placed in six orbital planes at a distance of around 20,200 kilometres above the Earth's surface. The satellites orbit with a twelve hour orbital period and an inclination angle of 55 degrees. Each satellite broadcasts a radio frequency signal at a centre of frequency of 1575.42 megahertz, known as the L1 band. The transmitted signal is modulated by a 10.23 megahertz clock to provide a precise ranging signal, in addition to a 1.023 megahertz clock, to provide a course acquisition code ranging signal. At any time and at any position on the Earth's surface, a minimum of five satellites are in line of sight view. Provided that at least three satellites are within line of sight, such that a receiver can receive a signal from said satellites. It is possible for the GPS receiver equipment to calculate the precise latitude and longitude positions of the device on the Earth's surface.

Vehicles 101 and 102 are fitted with aerials 108 configured to receive transmission from the GPS satellites such that positional information, in terms of longitude and latitude, may be determined from the received signals. At specified intervals within the vehicle's journey, this information is recorded and accumulated locally within the vehicle by means of a data accumulation device.

When the ignition of a vehicle is turned off, the data accumulation device will wait for twenty seconds before broadcasting a request packet via a second aerial 109. If the vehicle is within the vicinity of a data collection point 106, the transmitted radio signal will be received by an aerial 110 at the data collection point and relayed to the data processing station, at location 107. This in turn may then initiate a conversation between the data accumulation device and the data processing station so as to effect a download of the data accumulated by the vehicle.

Data collection point 106 includes a power supply 111 configured to supply power to a radio interface 112 and a communications interface 113. The radio interface 112 is substantially similar to data communication devices within the vehicles and facilitates radio communication with said vehicles. Communication to and from the radio interface is effected via a conventional serial RS232 interface which in turn communicates with the communication interface 113. Communications interface 113 provides for a current loop, transmitted via cables 114, so as to facilitate communication with the processing station 107.

Figure 2:
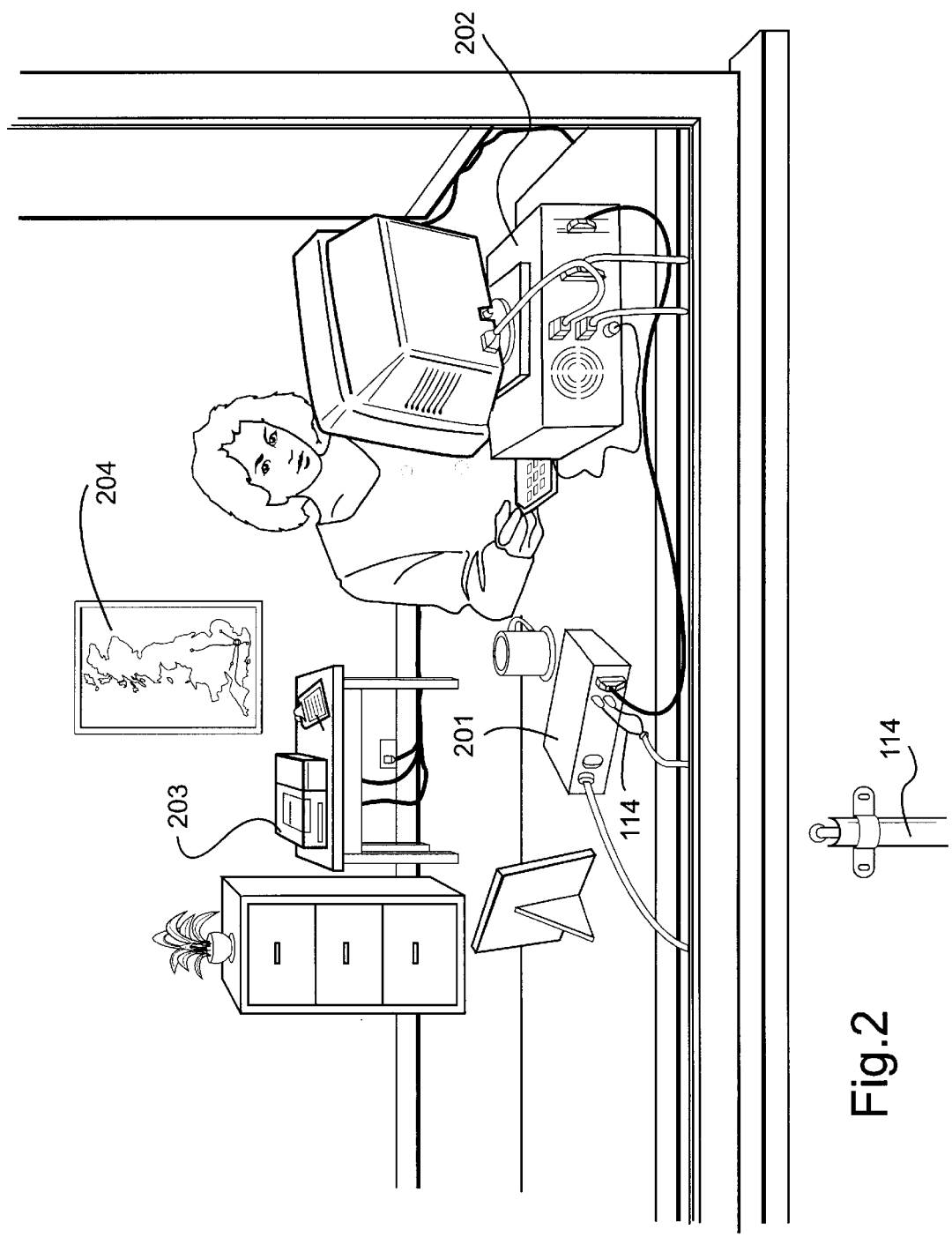
FIG. 2 details the data processing station identified in FIG. 2, including a communications interface, a data processing system and a map of a geographical area of interest.

Processing station 107 is detailed in FIG. 2, arranged to receive current loop cables 114 which are in turn supplied to a second communications interface 201. Interface 201 includes a serial RS232 interface which is in turn connected to a data processing system 202, preferably operating under the control of Windows NT or a similar multi-tasking operating environment.

The accumulation of data by the data processing system 202 may be effected essentially as a background process, thereby allowing said system to be used, for example, for general purpose office activities. In this way, the information is readily available to an operator as and when required. The operator may print results and maps etc via an appropriately interfaced laser printer 203 and a map 204 of the geographical area of interest may be made available for conventional marking etc.

Figure 3:
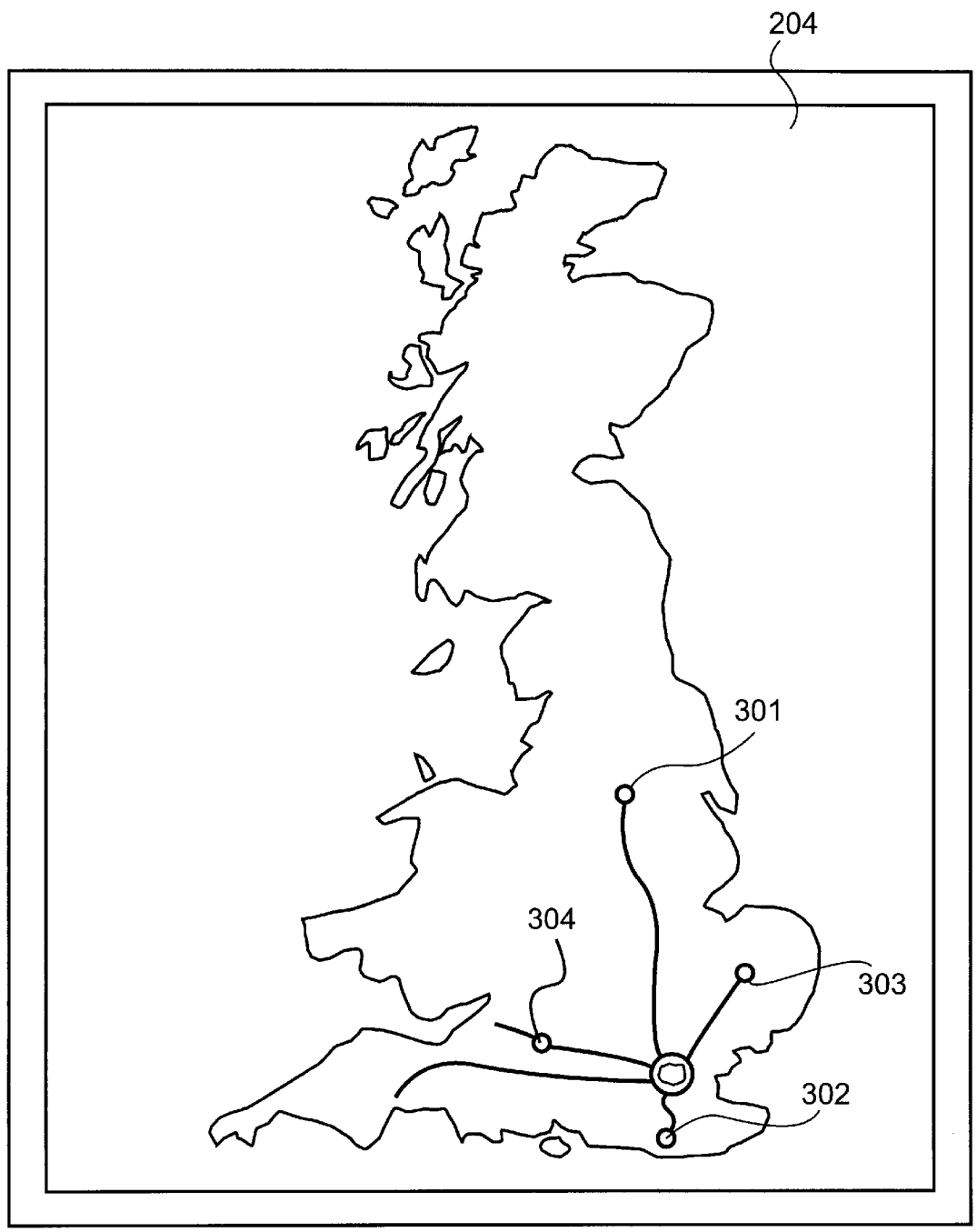
FIG. 3 details the map identified in FIG. 2, showing the position of co-operating depots of the type identified in FIG. 1.

Map 204 is detailed in FIG. 3. In this example, the fleet operator has a main depot in Leeds 301, with subsidiary depots in Brighton 302, Cambridge 303 and Swindon 304. At depots 302, 303 and 304 data may be collected from vehicles using equipment similar to that shown in FIG. 1. However, the main data processing system is present at location 301 and the information obtained from locations 302 to 304 is relayed to the station at location 301 over a public telephony network. For example, the information could be relayed over the Internet, over the PSTN or over an ISDN connection, depending upon the quantity of data and the speed of transmission required.

A vehicle may enter a depot belonging to another contractor or may accidentally be in the vicinity of a data collection point provided by another operator. Under these circumstances, the vehicle would generate a first packet upon its ignition being turned off. Data collection points in the vicinity would detect this first packet but, subsequent analysis by an associated data processing system would not recognise the calling packet therefore no further download of information would be initiated and the vehicle's accumulated data would not be cleared. All data accumulation devices are provided with a unique address upon manufacture and data processing stations are then programmed so as to be aware of specific data accumulation devices sold or leased to that particular customer.

Figure 4:
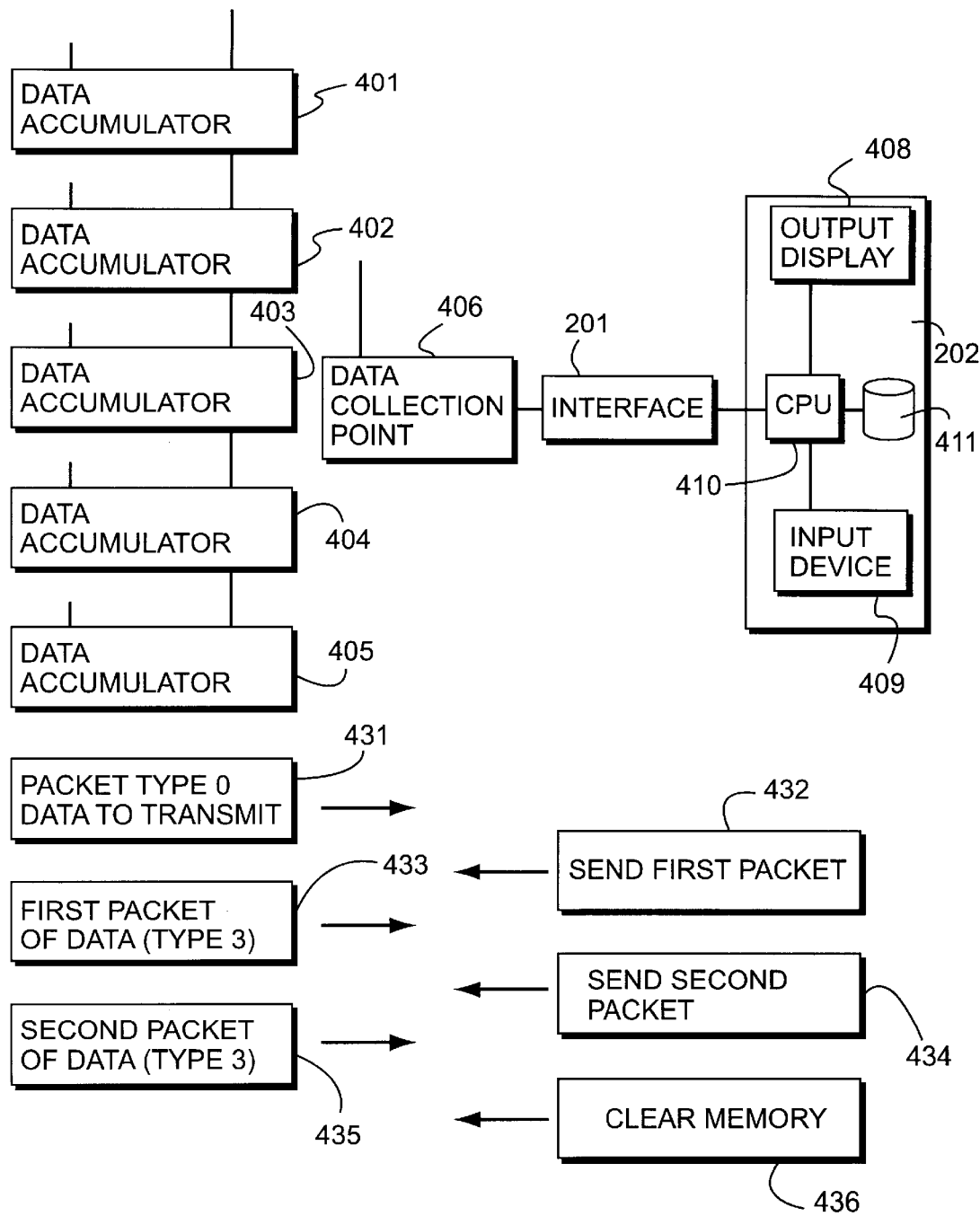
FIG. 4 schematically represents communications between data accumulation devices, mounted in vehicles of the type shown in FIG. 1, the data collection point shown in FIG. 1 and the data processing station identified in FIG. 2.

Operation of the data accumulation and transmission system is illustrated in FIG. 4. In this example, five data accumulation devices 401, 402, 403, 404 and 405 have accumulated data to transmit to a data collection point 406. The data collection 406 relays information to and receives information from data processing system 202, having an output display device 408, an input device 409, a central processing unit 410 and a permanent storage device 411. The processing system communicates with the data collection point via interface 201.

Each data accumulation device 401 to 405 transmits a packet of type zero, shown schematically as 431, to the data collection point 406. Information is relayed to the data processing system 202 which will first be checked to determine whether the accumulation device belongs to its associated group of accumulation devices. If this question is answered in the affirmative, to the effect that it is legitimate for a download of information to take place, the data processing system issues an instruction to the requesting accumulation device in the form of a "send first packet" instruction 432. Upon receiving this instruction the addressed accumulation device issues its first packet of data, illustrated as 433. After receiving this first packet of data, the data processing system issues a further instruction 434 instructing the addressed accumulation device to send a second packet of data. The accumulation device again responds to this instruction by sending its second packet of data 435 and in this example it is assumed that this represents the final packet of data. The data processing system is aware of this being the final packet of data and therefore subsequently issues an instruction 436 for the addressed accumulation device to clear its memory, so that further data may be accumulated on a subsequent trip.

The transfer of packets in FIG. 4 illustrates a conversation between the data processing system 202 and one of the data accumulation devices 401 to 405. The data processing system 202 is configured to maintain many communications of this type and the transmission of packets belonging to different conversations is effectively multiplexed. This is achieved because, with the exception of the type 1 data packet, requesting a conversation to be established, all conversations are initiated by the processing system 202. Thus, the data accumulation device may make a request to initiate a conversation but, thereafter, it is the data processing system which generates instructions and the data accumulation devices may only respond after receiving such instructions. Furthermore, the amount of data which may be supplied in a single packet transmitted by a data accumulation device is restricted such that no one data accumulation device may saturate the available bandwidth and the distribution of transmission bandwidth is maintained under the control of the data processing system 202 in this way the data processing system 202 may be configured to allocate substantially similar bandwidth to the data accumulation devices or it may include more sophisticated instructions to identify prioritised accumulation devices, where an attempt will be made to download information from these devices in preferences to devices which are not considered to have such a high priority. Thus, for example, the data processing system may give priority to accumulation devices which have a relatively, large amount of data stored therein or priority may be given to accumulation devices which are not seen very often.

Figure 5:
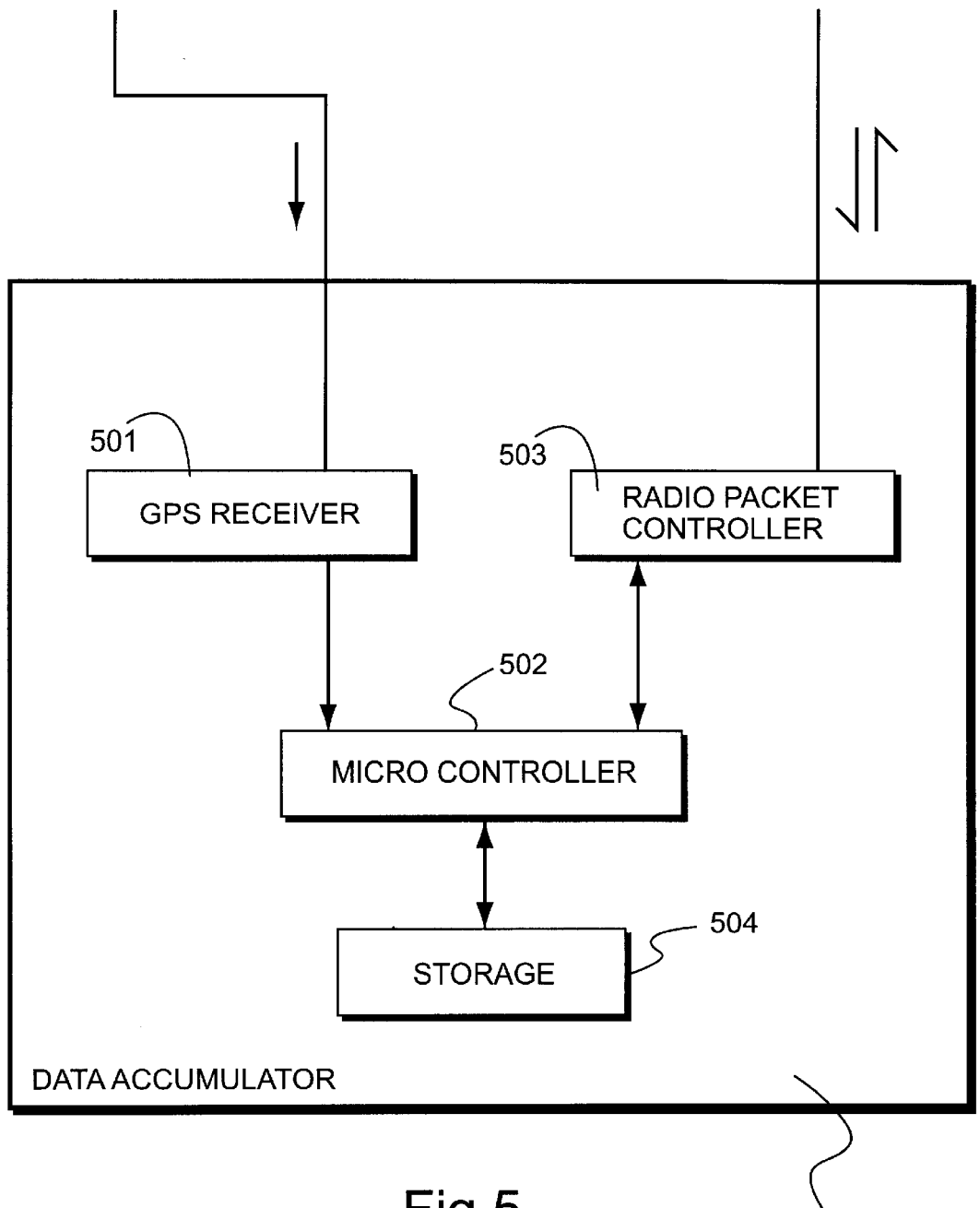
FIG. 5 details a data accumulation device of the type illustrated in FIG. 4, including a micro-controller and a radio packet controller.

Data accumulation device 401 is detailed in FIG. 5 and includes a GPS receiver 501, a micro-controller 502, a radio packet controller 503 and a data storage device 504. GPS receiver 501 is a Rockwell Jupiter 12 channel device and the output from the GPS receiver 501 is analysed by the micro-controller 502 which in turn writes data, in the form of 24-bit words, to storage device 504. The storage device includes battery back-up such that the integrity of any stored data is maintained in case of vehicle power failure.

The radio packet controller is typically an RPC 418 manufactured by Low Power Radio Solutions Limited of Witney, Oxfordshire, GB. The controller includes a standing acoustic wave FM transmitter in combination with a super-heterodyne receiver and may operate upto a range of 120 meters over open ground. It is configured to transmit packets having upto 27-bytes at a rate of 40 kilobits per second, half duplex. Packets of upto 27-bytes are assembled by the micro-controller 502 and supplied to the radio packet controller 503. The packet controller includes collision avoidance measures such that it listens for other transmitted packets before transmitting itself.

A data packet received by the radio packet controller 503 is decoded and stored in a incoming packet buffer, whereupon the micro-controller 502 is signalled, via an interrupt line, to the effect that a valid packet is waiting.

Micro-controller 502 may be considered as being placed in one of three operating conditions. When the vehicle ignition is on, the micro-controller will endeavour to receive GPS information and to store coded versions of this information within its storage device 504. Data representing an initial start location is recorded and, ultimately, a final stop location is recorded. During a journey, positional information is recorded on a regular basis, typically from one minute intervals upwards, with real-time information being derived from the satellite signal every ten minutes, every thirty minutes or every hour etc.

After the ignition of the vehicle is turned off, the micro-controller will endeavour to download its stored information via the radio packet controller. Such a downloading operation is only successful if an initial packet, packet 431, is intercepted by a data collection point, resulting in a packet similar to packet 432 being transmitted. If such a packet is not received by a data accumulation device, packet 431 is re-transmitted after appropriate intervals for an appropriate time-out period. These durations are adjustable but, typically, a data accumulation device would attempt to establish communication with a data collection point for a period of approximately ten minutes. However, it is preferable to introduce a degree of randomness in this process such that, when a plurality of vehicles arrive at a depot substantially simultaneously, they will not, even if turned off at the same time, generate packets at the same time. This in turn will allow several conversations to be multiplexed so as to ensure that a majority of vehicles perform a data download.

Figure 6:
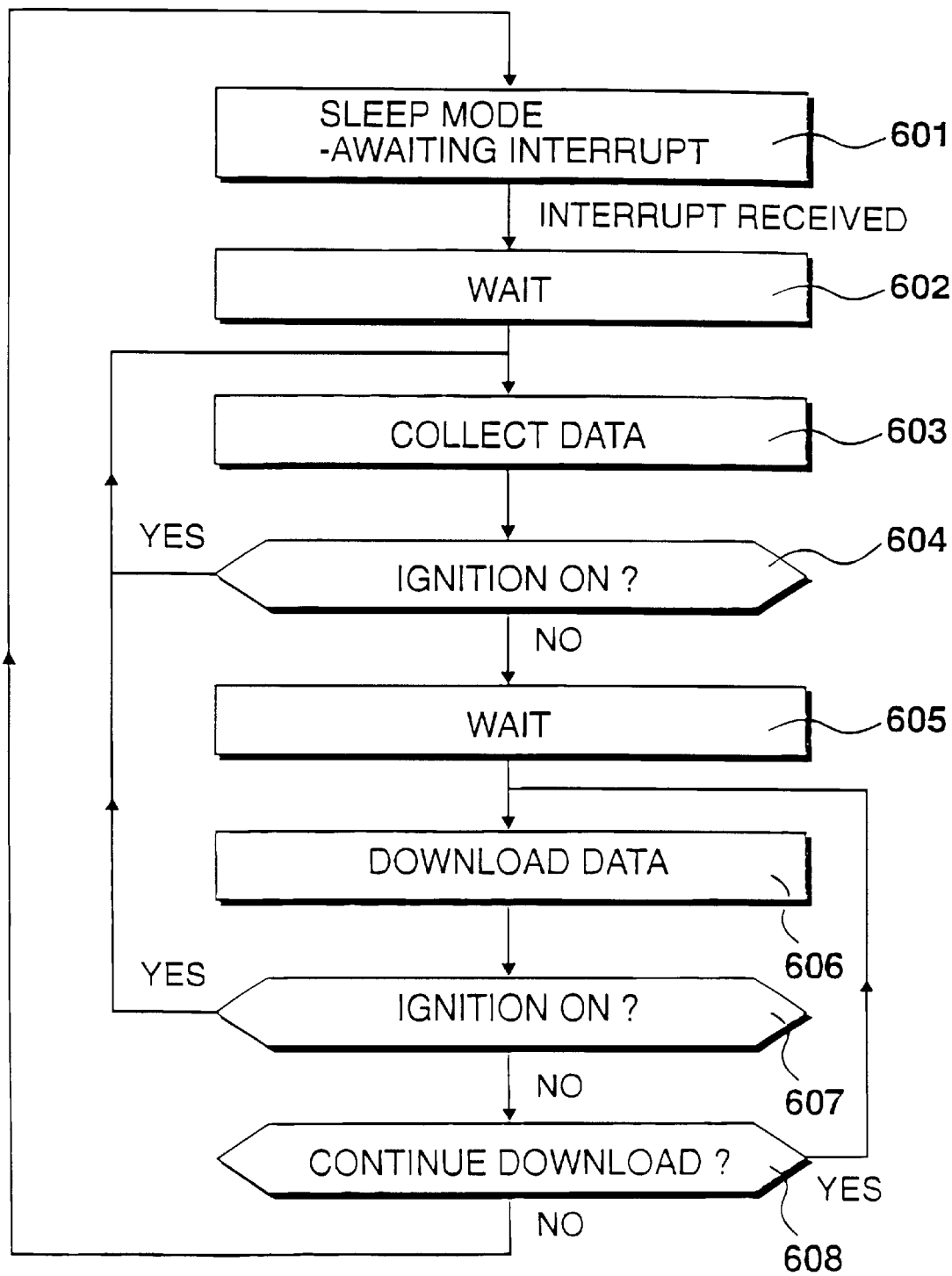
FIG. 6 illustrates operations performed by the micro-controller included in FIG. 5, including a data collection process and a data download

Ultimately, after failing to download information, after a download operation being interrupted or after a download operation being successfully completed, the data accumulation device will effectively enter a sleep mode, as identified at step 601 in FIG. 6.

The micro-controller 502 is interrupted by the vehicle's ignition being switched on, resulting in control entering step 602 at which the processor enters a wake state. After an appropriate wait, possibly in the region of ten seconds, the micro-controller collects data at step 603. At step 604 a question is asked as to whether the ignition is still on and if answered in the affirmative, control is returned to step 603. Thus, upon each iteration of step 603, an appropriate period of time elapses until the specified collection time is reached. Upon reaching the appropriate collection time, the position of the vehicle is determined, from the information received from the GPS receiver 501 and an appropriate data entry is written to the storage device 504.

If the question asked at step 604 is answered in the negative, the vehicle has been switched off, resulting in the micro-controller 502 making an attempt to download data. A wait state is entered at step 605, whereafter data download procedures are effected at step 606.

After the transmission of each data packet, a question is asked at step 607 as to whether the ignition has been turned on and if answered in the affirmative, the micro-controller 502 is redirected to its data collection process 603. Alternatively, if the question asked at step 607 is answered in the negative, a question is asked at step 608 as to whether the download is to continue. This question will be answered in the negative if all of the data has been transmitted or if communication with the data collection point has been lost. When answered in the affirmative, control is returned to step 606 and the downloading operation continues. Alternatively, if the question asked at step 608 s answered in the negative, control is returned to step 601 and the micro-controller re-enters its sleep mode.

Positional data is written to storage device 504 as 24-bit words. Each word represents a particular information type and a set of information types is illustrated in FIG. 7. The information types comprise a date 701, a start time 702, a stop time 703, an absolute latitude 704, an absolute longitude 705 and a relative latitude and longitude combined into a single 24-bit word, 706.

A first grouping of bits represents the information type, with a second grouping representing the information itself and a division between these two groupings is illustrated by line 707. An absolute latitude 704 and an absolute longitude 705 require a total of 22-bits, represented as T bits and G bits respectively. An absolute latitude is identified by type code 10 and this distinguishes it from an absolute longitude having type code 11.

After an absolute longitude and an absolute latitude have been recorded, subsequent positional data is stored as a relative latitude and longitude, by subtracting the absolute values previously recorded from a present position. This provides a level of compression such that only 11-bits are required for the relative latitude with a further 11-bits being required for the relative longitude. Thus, a word of this type is identified by word type code 01.

Word type code 00 precedes the other three types of words which are then uniquely defined by lower significant bits 17 to 21. It can be appreciated that the provision of this number of bits for identifying word types allows other types of words to be recorded, which may be reserved for user-specific information. Thus, bits 17 and 18 are used to distinguish a date, a start time and a stop time, with bits 0 to 16 being used to convey the associated data.

A typical data set would be initiated with the recording of the date. This would be followed by a start time which is then followed by an absolute latitude and an absolute longitude. While the vehicle remains in motion, relative values may be recorded and, under normal operating conditions, words of type 706 would constitute the bulk of the stored information, thereby obtaining maximum advantage from the compression provided by this word type. When the vehicle stops, the device would record a final absolute latitude and an absolute longitude and the data set would be terminated by a stop time and again the date. Thus, short journeys result in relatively small data sets with larger journeys producing larger data sets. However, during the recording and subsequent downloading of information, it is not necessary for a vehicle operator to interact with the apparatus in any way, thereby reducing any additional burdens placed upon the driver while significantly reducing the risk of the apparatus being mis-used.

Figure 8:
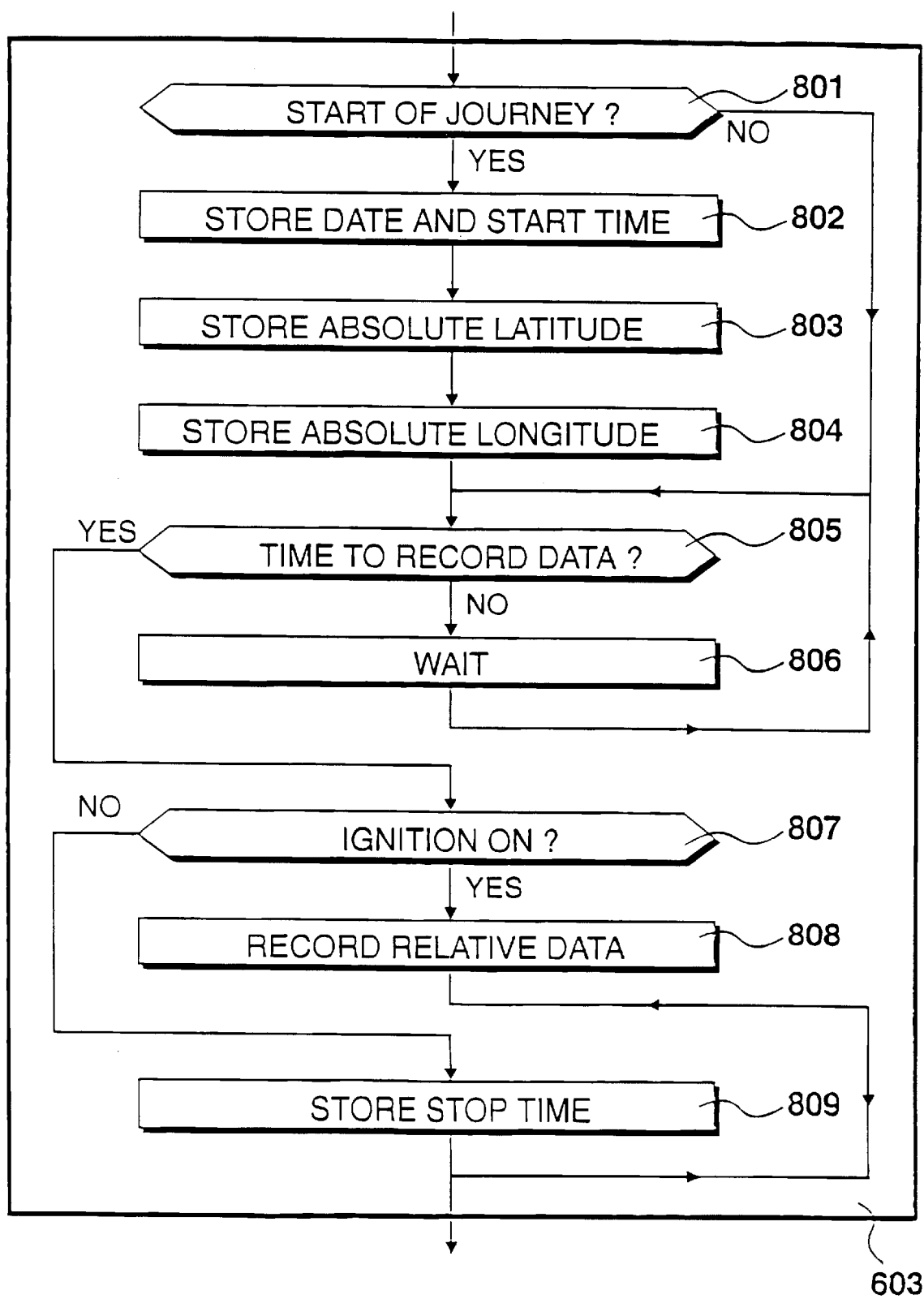
FIG. 8 details the data collection process identified in FIG. 6, configured to store data using the format identified in FIG. 7.

Process 603 for the collection of data, of the type illustrated in FIG. 7, is detailed in FIG. 8. At step 801 a question is asked as to whether this is the start of the journey, which would be answered in the affirmative on the first iteration. Consequently, the date (data type 701) and the start time (data of type 702) are stored in storage device 504 at step 802. At step 803 the absolute latitude is stored and at step 804 the absolute longitude is stored.

The processor will then enter a loop including wait state 806 until it is time, usually after a period of ten minutes, for the next data entry to be recorded. Thus, after this period of time, the question asked at step 805, as to whether it is time to record data, will be answered in the affirmative, resulting in control being directed to step 807.

At step 807 a question is asked as to whether the ignition is on and if answered in the affirmative relative data, of type 706, is recorded at step 808. Thereafter, control is returned to step 604 which in turn may result in control being directed to step 801, with the process being repeated. Thus, on the second and subsequent iterations, the question asked at step 801 will be answered in the negative, resulting in control being directed again to step 805.

Eventually, the ignition will be turned off, resulting in a question asked at step 807 being answered in the negative. Control is directed to step 809, resulting in the stop time being recorded, whereafter control is directed again to step 604, which will result in control being directed to wait state 605.

Radio packet controller 503 is arranged to receive packets containing upto a total of 27-bytes from the micro-controller 502. Consequently, process 606, controlling the downloading of data, is arranged to assemble data packets which conform to this format for subsequent application to the radio packet controller 503.

Figure 9:
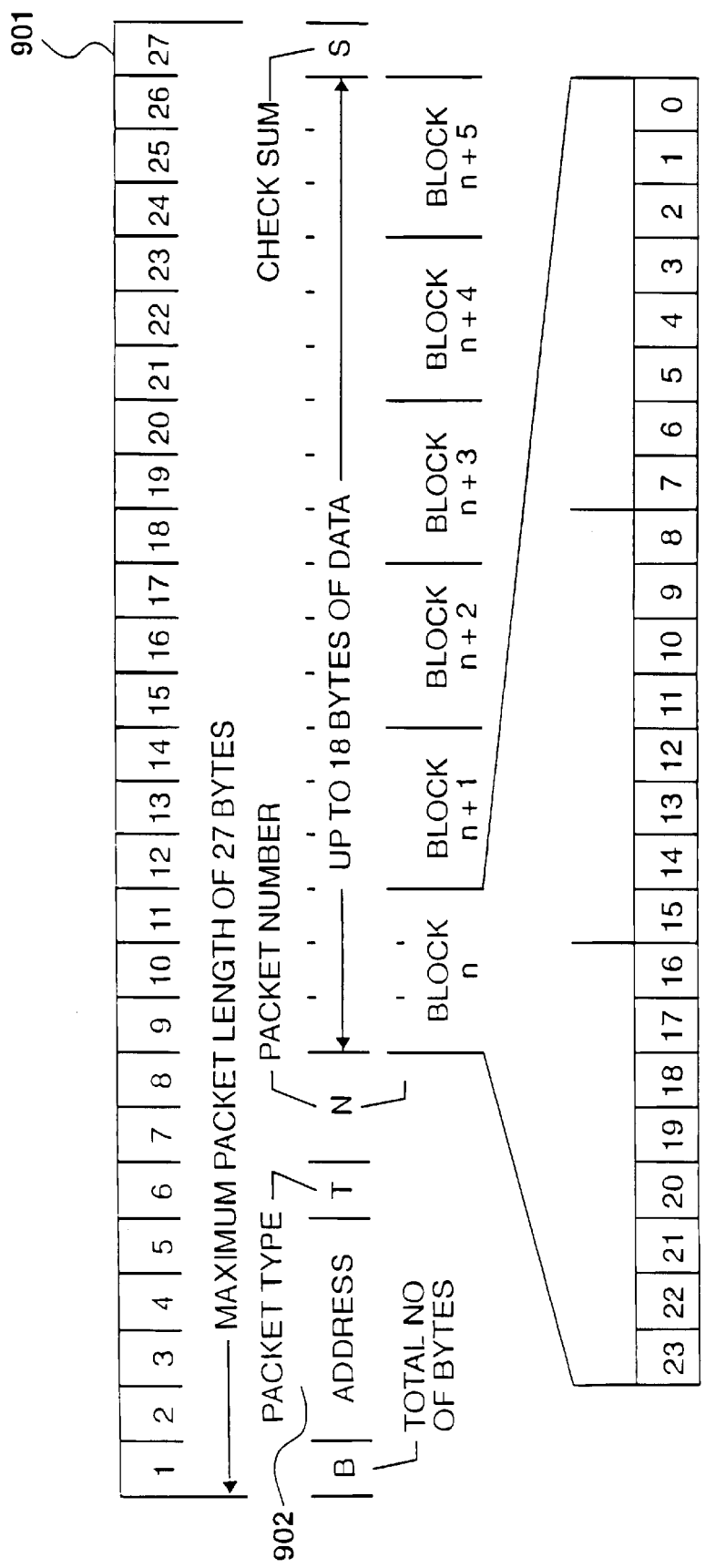
FIG. 9 illustrates the formatting of packets for application to the radio packet controller shown in FIG. 5, under the data downloading process identified in FIG. 6.

The structure of packets which may be handled by the radio packet controller 503 is illustrated in FIG. 9. Packets are identified by 8-bit bytes and herein bytes are numbered from the left starting at 1, whereas bits are number from the right starting at zero. The transmitted packets may have a total of 27-bytes 901, where the first byte B represents the total number of bytes contained in the packet. The following four bytes 902 represent a unique 4-byte address which is encoded into each data accumulation device, of the type shown in FIG. 5, during the manufacturing process. This ensures that all data accumulation devices are unique, such that it is not possible for data to be downloaded at an inappropriate site.

The 4-byte address 902 is followed by a 1-byte packet type T, at byte location 6, followed by a 2-byte number N which will usually represent the packet number. This is then followed by upto 18-bytes of data, bytes 9 to 26, followed by a check sum S at byte location 27 or at the final byte location for a packet containing less than 27-bytes.

The 18-bytes of data are considered in the embodiment as six 24-bit blocks, identified as blocks n, n+1, n+2, n+3, n+4 and n+5. Thus, each packet transmitted by the radio packet controller may contain a total of six blocks of the type illustrated in FIG. 7. Sometimes less than six blocks of data may be available and, under these circumstances a data packet is transmitted having less than 27-bytes.

Figure 10:
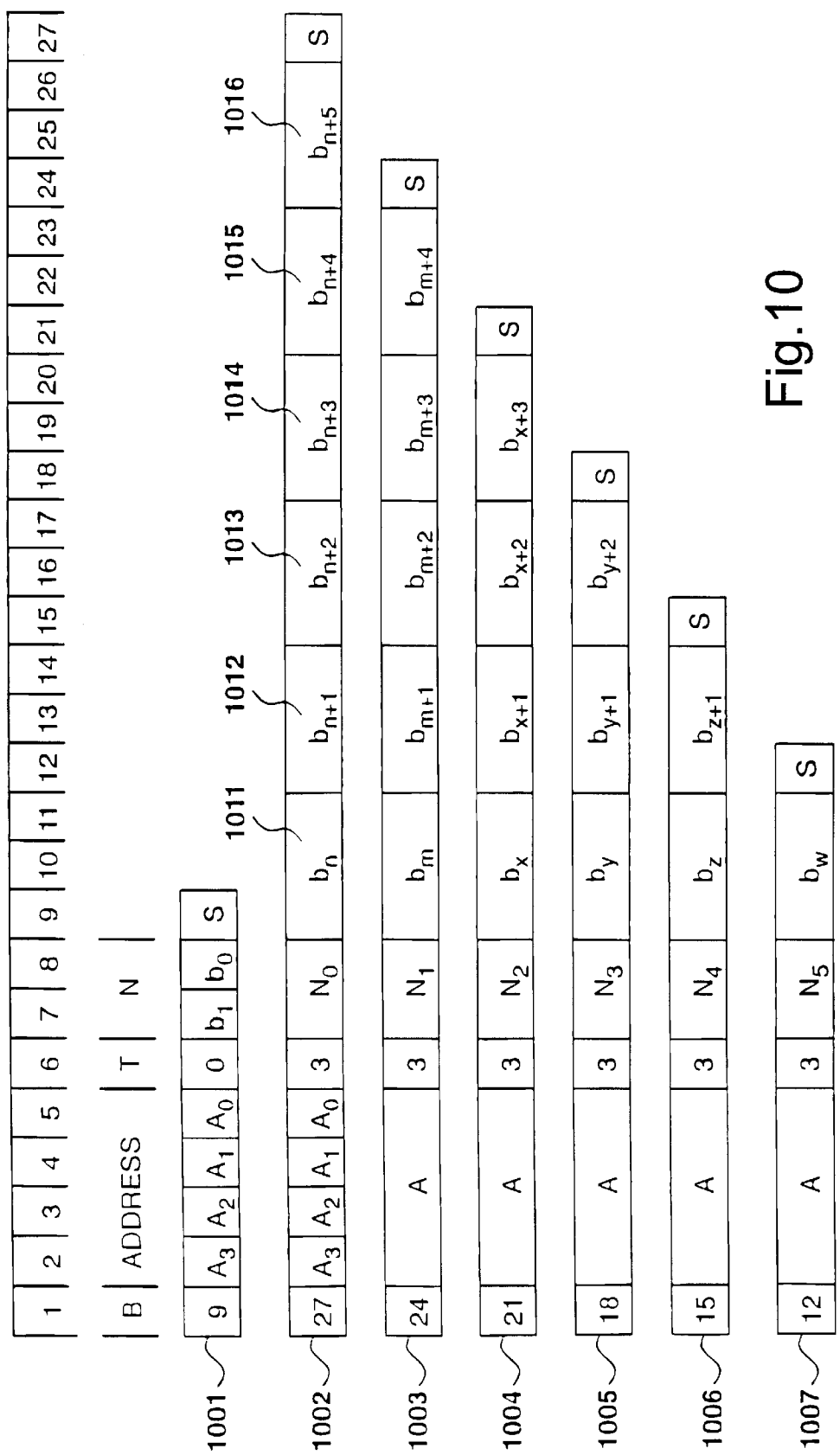
FIG. 10 identifies particular packet types assembled by data accumulation devices of the type shown in FIG. 4.

Packet types transmitted by the radio packet controller 503, of a data accumulation device, are illustrated in FIG. 10. These consist of packet type zero, shown as 1001, which is equivalent to packet type zero shown in FIG. 4 as 431. Packets 1002, 1003, 1004, 1005, 1006 and 1007 are all packet types three, where packet 1002 contains six data blocks 1011, 1012, 1013, 1014, 1015 and 1016. Thus, transmitted block 433 shown in FIG. 4 would be a data block of type 1002, whereas the final data block, shown as 435, could be of any types 102 to 107, depending upon the amount of data remaining to be transmitted.

Block type 1001, identifying that a data accumulation device has data to download, consists of a total of 9-bytes, therefore the first transmitted byte identifies this total number. As for all transmitted packets, the subsequent 4-bytes identify the unique address of an accumulation device and the sixth byte identifies the packet type which, in this example, is of type zero.

For packet type zero, shown at 1001, bytes 7 and 8 represent the total number of data blocks, that is 24-bit blocks of the type shown in FIG. 7, stored at the data accumulation device. This information informs the data processing station as to how many blocks of data are to be expected. With this information, the data processing station is made aware as to when a transfer has completed. It will know the size of the final packet and it will know when to transmit a clear memory packet. Similarly, it will also know if a data download has been prematurely terminated and, with this information, it may also prioritise a downloading process so that priority is given to vehicles having relatively full memories. As for all the transmitted packets, packet 1001 is terminated with a check sum.

For data packets, such as packets 1002 to 1007, bytes 7 and 8 are used to identify the packet number. Thus, a first transmitted data packet would be identified as packet one, with subsequent packets being identified sequentially. In this way, it is possible for the data processing station to ensure that all packets have been received and to take appropriate action if one of the expected packets is missing. Under some circumstances, the data processing system may ignore a missing packet. During the middle of a journey, for example, lost data may be irterpolated from surrounding data. Alternatively, if a packet is lost, the download may be terminated without clearing memory, such that the system will wait for an appropriate opportunity to initiate the download sequence again. In an alternative more sophisticated embodiment, the data processing station may issue a request for a lost packet to be retransmitted and such requests and retransmitted packets may be identified with appropriate packet types.

Figure 11:
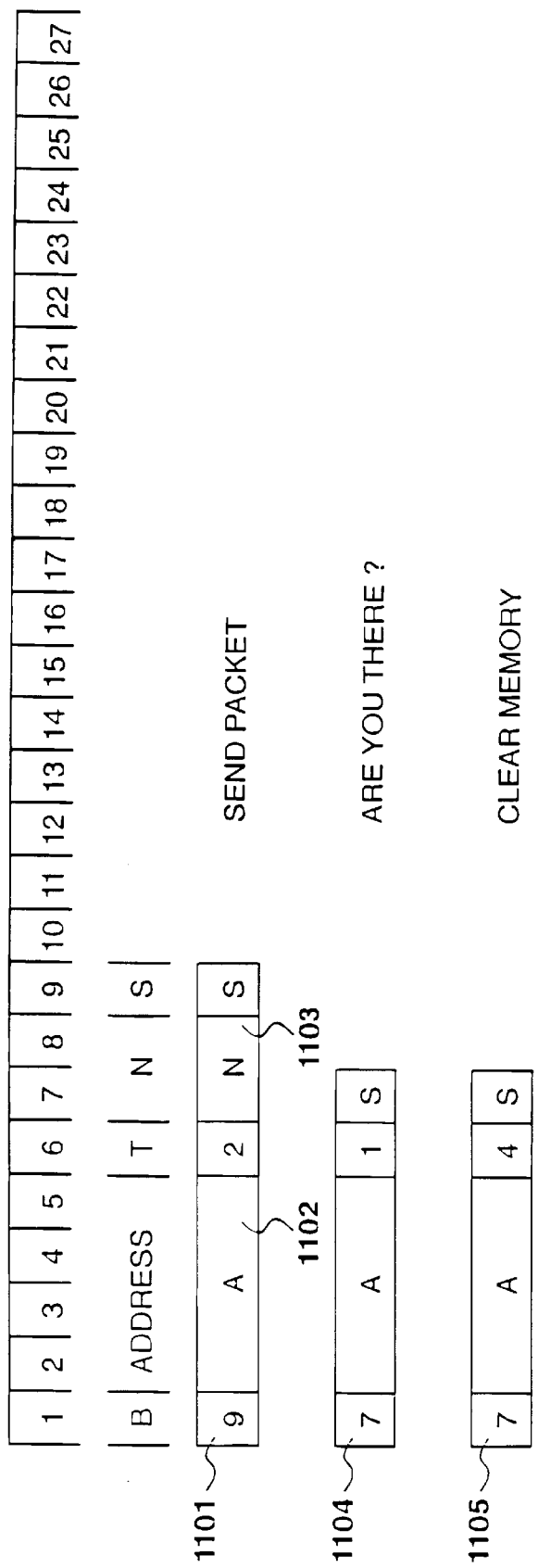
FIG. 11 illustrates particular packet types assembled by the data processing station illustrated in FIG. 4.

Packet types transmitted by the data processing system are illustrated in FIG. 11. These packets are of relatively short duration, given that they are merely issuing instructions to the data accumulation devices and do not transmit data as such.

Packet type 1101 instructs an addressed data accumulation unit to send a particular packet. The data accumulation unit instructed is identified by 4-bytes address 1102, followed by byte position 6 identifying the packet as a type two packet. After receiving this information, the addressed accumulation device understands the packet type as being an instruction to transmit a particular packet and the particular packet to be transmitted is identified by packet number 1103 at byte positions 7 and 8. This is then followed by the check sum byte given a total packet length of 9-bytes.

Packets 1104 instructs a data accumulation unit to confirm that it is still active and still has data to transmit. If the data processing station performs a time-out, to the effect that it has not received information back from a data accumulation unit for an unacceptable period of time, a packet of type 1104 may be transmitted, identified as a packet of packet type 1, which may result in a packet of packet type zero being retransmitted by the data accumulation device. Eventually, after several packets of this type being transmitted, the data processing system may assume that communication has been terminated and take appropriate action. Packet type 4 is illustrated at 1105 and consists of the instruction, identified by byte location 6, for the addressed data accumulation unit to clear its memory. This completes the download procedure and results in a data accumulation unit being in a position to re-use its memory for new positional data.

Figure 12:
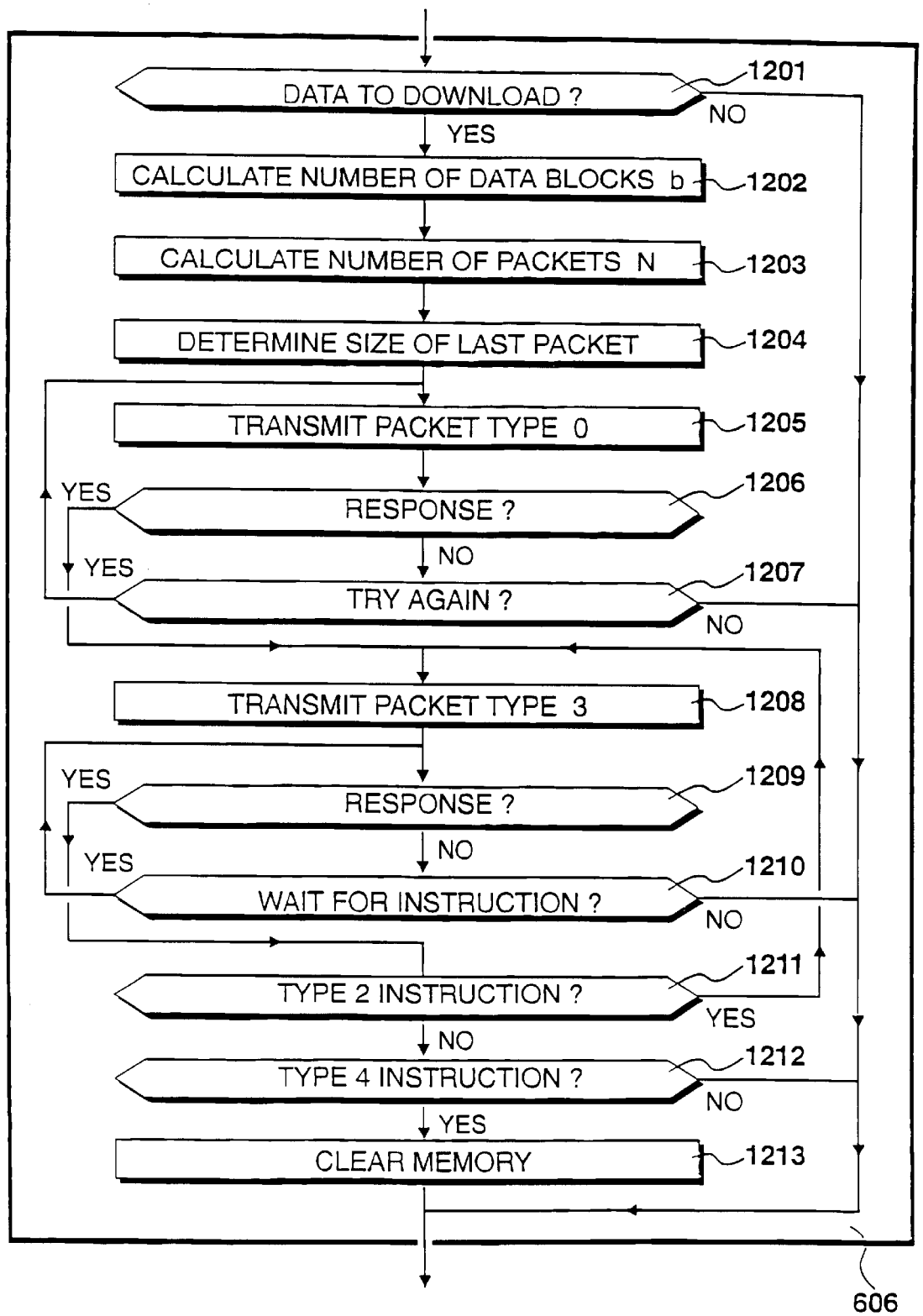
FIG. 12 details procedures performed by the micro-controller shown in FIG. 5 for packet communication.

Procedures 606 for the downloading of data, using the packet protocol shown in FIG. 10, are detailed in FIG. 12.

At step 1201 a question is asked as to whether data is present in storage device 504 and if answered in the affirmative a calculation is made as to the number of data blocks present within storage device 504. Having determined the number of 24-bit data blocks b present within the storage device 504, the number of packets N required to download this data is calculated at step 1203. This value is divided by six and the remainder identifies the type of the final packet to be transmitted, taken from the set 1002 to 1007.

Having made the calculations through steps 1202 to 1204, it is possible for the download process to be initiated. At step 1205 a packet of type zero is transmitted making a request to initiate data download. A question is asked at step 1206 as to whether a response has been received and if answered in the negative, a question is asked as to whether the process should try again. If answered in the affirmative, control is returned to step 1205 and a packet of type zero is transmitted again. If after several attempts no response is received, the question asked at step 1207 will be answered in the negative and the download will terminate.

If a response to the transmission of packet type zero is received, resulting in the question asked at step 1206 being answered in the affirmative, control is directed to step 1208, resulting in the first packet of type three being downloaded to the receiving station. Again, the accumulation devices asks, at step 1209, whether a response has been received and if no further instructions are received, the micro-controller 502 will again time out and he download operation will terminate.

If a response is received, the question asked at step 1209 is answered in the affirmative and a question is then asked as to whether it is a type two instruction, requesting more data, or a type four instruction, instructing the micro-controller to clear its storage device 504. Thus, a question is asked at step 1211 as to whether a type two instruction has been received. This question is answered in the affirmative, control is returned to step 1208 and a packet of type three is transmitted again. Alternatively, if the question asked at step 1211 is answered in the negative, a question is asked at step 1212 as to whether a type four instruction has been transmitted and, in this embodiment, having answered question 1211 in the negative, question 1212 should be answered in the affirmative, resulting in the memory being cleared at step 1213.

Figure 13:
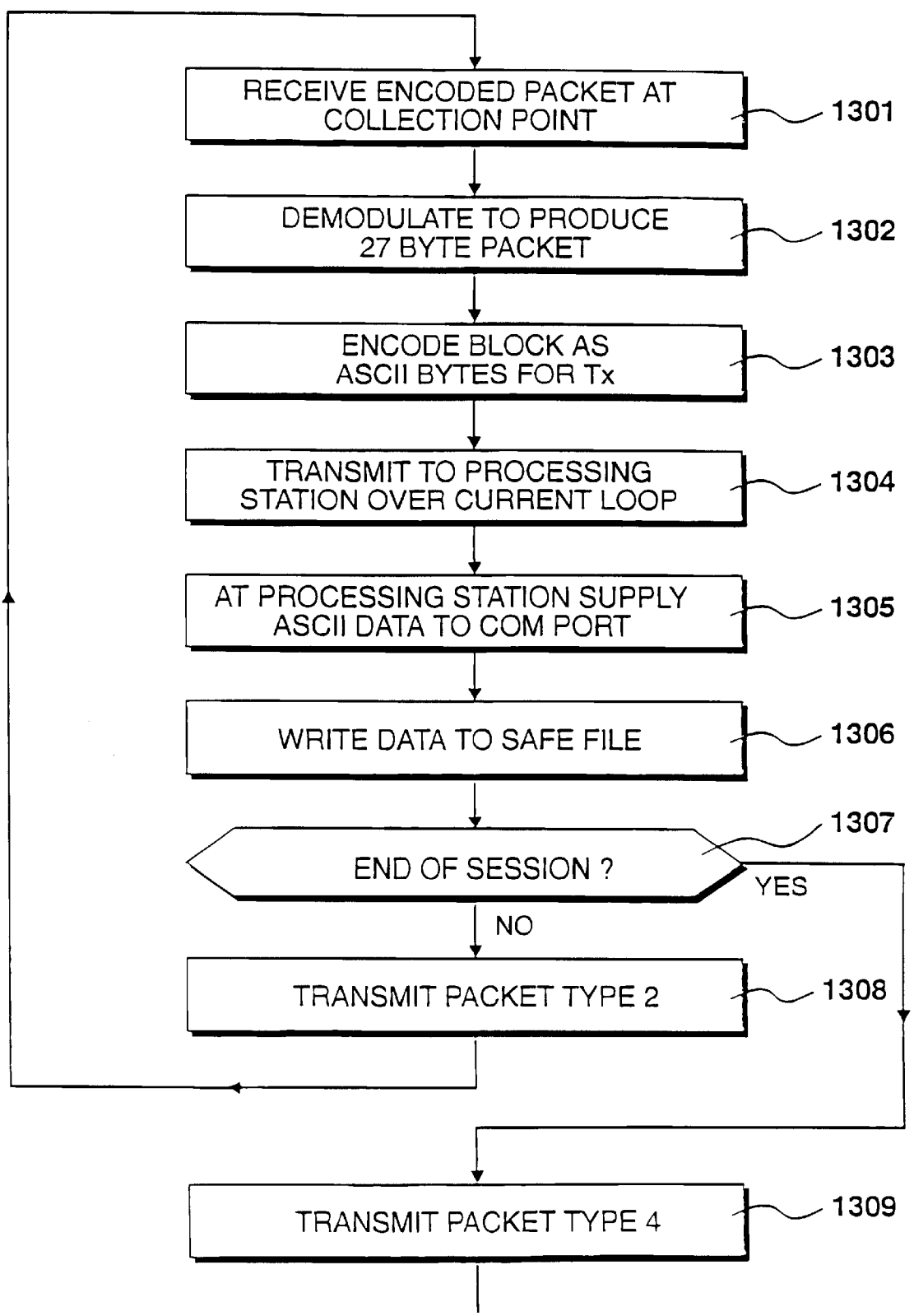
FIG. 13 details procedures effected by the data collection point and the data processing station shown in FIG. 4 for packet communication, including a step of writing data to a safe file.

The data processing system 201, 202 and the data collection point 106 may be considered in combination as the data collection base-station. Operations performed by this combination are summarised in FIG. 13.

At step 1301 an encoded packet is received at the collection point 106, which in turn demodulates this packet at step 1302 into a 27-byte or less packet. These bytes of data are encoded into ASCII representations to facilitate transmission of conventional interfaces.

At step 1304 the ASCII data is transmitted over the current loop 114 and reconverted at interface 201 into conventional serial interface (RS 232) ASCII bytes. The ASCII bytes are transmitted to the processing system 202 at step 1305 and at step 1306 received data is written to a safe file. Preferably, this file exists in randomly accessible memory within the processing system 202 so as to ensure that the data is quickly recorded during the transmission process. Thereafter, this volatile file is backed-up onto permanent storage 411 within the processing system 202.

A question is asked at step 1308 as to whether the session has ended and if answered in the negative, a packet of type two is transmitted as an instruction for subsequent data to be downloaded. Alternatively, when the question asked at step 1308 is answered in the affirmative, a packet of type four is transmitted at step 1310, instructing the originating data accumulation device to clear its associated memory.

Operations performed by the data processing system 202 are complicated by the fact that it may be communicating with many data accumulation devices. However, this multi-tasking situation is facilitated by a multi-tasking operating system and the multiplexing of transmission is controlled because all data transfers can only take place after the data processing system has supplied an instruction for a data packet to be downloaded.

The 24-bit blocks of data are written to the safe file, resulting in a collection of data substantially similar originally recorded by the accumulation devices. Each accumulation device is allocated its own specific file path, although several files may be generated for individual accumulation devices which are subsequently combined during an operation of posting the accumulated data to a relational database.

Figure 14:
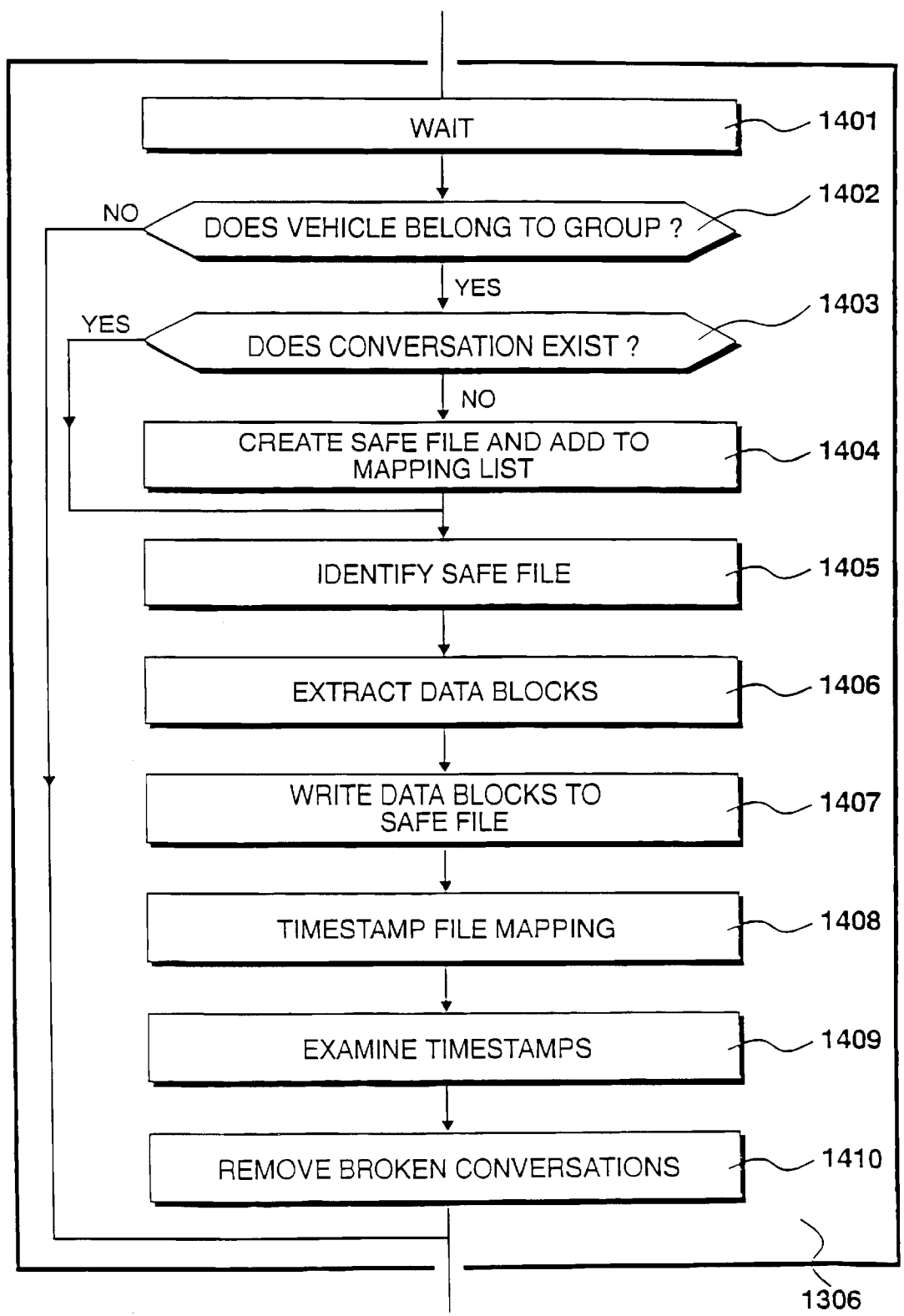
FIG. 14 details the writing step identified in FIG. 13, in which data is written to a plurality of files.

Operations performed by data processing system 202 are shown in FIG. 14. The operations are initiated in response to a packet of information being received from interface device 201. Alternatively, in less sophisticated embodiments, the data may be received directly from radio interface 112, subject to the length of the transmission distance.

Upon receiving a packet of information, the data processing system enters a wait state at step 1401. When activated to handle data transmissions of this type, the data processing system 202 is relatively fast and therefore wait states are incurred in order to bring its operational times more into line with the packet transmission times over the radio interface. In this way, the speed at which the data processing system handles radio communications is slowed down, thereby ensuring that the radio interface does not become too congested. The duration of wait state 1401 is determined empirically and effectively provides a balance between the number of data accumulation devices which may wish to download data simultaneously, the available radio bandwidth and the processing speed of the data processing system 202.

At step 1402 the address (bytes 2 to 5) of an incoming packet are considered and a question is asked to determine whether the vehicle belongs to the system's group. If this question is answered in the negative, no further action is taken and communication ceases.

If a received packet does belong to the croup, the question asked at step 1402 is answered in the affirmative and a question is then asked at step 1403 as to whether a conversation has already been established.

Figures 15, 16:
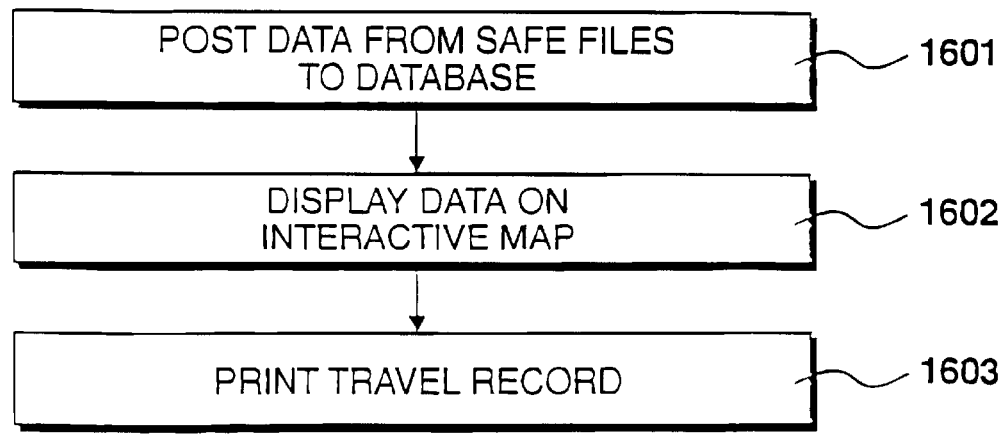
FIG. 15 identifies a table of files written to under the procedures identified in FIG. 14.
FIG. 16 shows further operations of the processing system identified in FIG. 2.

On receiving a first packet type zero, informing the data processing station that an accumulation device has data to transmit, the question asked at step 1403 will be answered in the negative, resulting in a new safe file being created at step 1401, with details being added to a mapping list as illustrated in FIG. 15. If a question asked at step 1403 is answered in the affirmative, to the effect that a file does exist, control is directed to step 1405.

At step 1405 the safe file associated with the particular data accumulation device (as specified by it's address) is identified and at step 1406 the data blocks are extracted from the transmitted packet. These extracted data blocks are written to the respective safe file at step 1407 and at step 1408 a time stamp is applied to the file mapping, identifying the time at which the last write operation was effected to said safe file.

At step 1409 all of the time stamps are considered and if any of the stamps are seen as being too old, it is assumed that a communication has terminated and appropriate action is take at step 1410. Thus, at step 1410, entries identified at step 1409 may be deleted from the file mapping. The data may be retained, in the hope that it may be added to later or, alternatively, the data may be deleted such that a complete download will be required subsequently. The system may include provisions to identify absolute positional data and to delete information received after the last absolute position.

A file mapping is illustrated in FIG. 15, which may be established as a linked list, so as to optimise memory availability. When a new data accumulation address is identified, an entry s placed in column 1501. The new entry is allocated a new safe file which, as shown in FIG. 15 and as listed at column 1502, consists of a directory path file, followed by a unique file name. The files are shown written to drive L, a logical random access memory drive, whereafter completed files are written to associated permanent storage, usually identified as drive C.

The associated time stamp is shown at column 1503, containing information representing minutes, seconds and fractions of seconds. This information is derived from the real-time system clock and merely represents the time at which the safe file was last updated. Thus, the time stamp provides a provision by which the system can determine when the file was last written to and if file writes have not occurred for a predetermined time, action may be taken to revive a communication, by the transmission of a packet of type 1104 (type 1) as shown in FIG. 11 or the communication may be terminated altogether.

After data has been collected as illustrated in FIG. 15, the data may be present in permanent storage in a form substantially similar to that form in which it was collected by the data accumulation devices. Having collected this information, many types of processing may be effected upon it in order to record and display the information in appropriate forms.

Firstly, referring to FIG. 3, data of this type, recorded at remote location 303, 302 and 304, may be transmitted to the main depot at location 301. At location 301, all of the data may be accumulated together, effectively in a form such that it is indistinguishable from data received locally. It is not necessary to distinguish data received from remote locations because of the nature of the data itself, representing geographical positions, will clearly identify where a download took place. However, should any ambiguity arise, it is possible to include additional data types added to the data representing a download location.

At the main data processing station, it is possible for data tasks to run concurrently with data collection exercises, as described above, and with other general purpose applications.

Preferably, the data is posted from the safe files to a relational database, as shown at step 1601. The database may take substantially conventional form and may be built upon standard applications, such as PARADOX™ or ACCESS™ etc. The data recorded by the GPS system identifies locations in terms of global longitudes and latitudes. In each country, this information may be converted into national grid references at step 1601, such that the information contained within the database may be related to other geographical entities.

At step 1602 the position of vehicles may be displayed on an interactive map, possibly shown on a monitor associated with system 202, as shown in FIG. 2. With this provision in place, the need for maintaining manual maps, as illustrated at 204, becomes significantly reduced.

At step 1603, recorded information in the form of graphical maps or textural lists, may be printed by means of laser printer 203.

What is claimed is:

1. A method of transferring accumulated data accumulated by a vehicle during operation of said vehicle and relating to operational characteristics of said vehicle, from a plurality of vehicles to a data processing station, said method comprising:

transmitting a first packet type request from each vehicle to a receiving station via an open radio channel not forming part of an established telecommunications network, in response to a predetermined operation;

detecting said first packet type at a data processing station if a transmitting vehicle is within the vicinity of said receiving station;

transmitting an instruction for data in the form of a second packet type from said receiving station upon detecting said first packet type; and transmitting a portion of a predetermined size of said accumulated data from a detected vehicle in response to said instruction to allow instructions for data to be transmitted to other vehicles in the vicinity to facilitate a downloading of said accumulated data from a plurality of vehicles in the vicinity.

2. A method as in claim 1, wherein said accumulated data represents vehicle positions.

3. A method as in claim 2, wherein said positional data is derived by receiving radio signals from satellites.

4. A method as in claim 1, wherein said data processing station includes a data collection point for receiving and transmitting radio signals and a data processing system for storing received data.

5. A method as in claim 1, wherein said predetermined operation comprises the vehicle ignition being turned off.

6. A method as in claim 5, wherein the accumulated data records positional information when the ignition is turned on.

7. A method as in claim 1, wherein said first packet type is transmitted after a relatively random period so as to minimize the risk of two vehicles transmitting at the same time.

8. A method as in claim 1, wherein accumulated data may only be transmitted in response to an instruction from a receiving station.

9. A method as in claim 1, wherein the size of a transmitted portion is restricted so that a packet containing said data portion may not exceed a predetermined size.

10. A method as in claim 1, wherein each radio packet controller is arranged to examine its receiver to determine whether any other transmissions are occurring, such that transmissions are only made when the transmission frequency is not being used by another device.

11. A method as in claim 1, wherein said accumulated data is accumulated by particular accumulation devices mounted to particular vehicles and which devices are identified by a unique address.

12. A method as in claim 1, wherein an instruction to clear memory is transmitted by said data processing station after the final portion of accumulated data has been received by said data processing station.

13. A method as in claim 1, wherein downloading priority is given to particular data accumulation devices or particular sets of accumulation devices.

14. A method as in claim 13, wherein downloading priority is given to accumulation devices having relatively large amount of data stored therein.

15. A method as in claim 1, wherein positional data is not recorded at specified times.

16. Apparatus for accumulating data accumulated by a vehicle during operation of said vehicle and relating to operational characteristics of said vehicle wherein data is accumulated at the vehicle and for transferring said accumulated data to a data processing station, said apparatus comprising:

transmitting means for transmitting a first packet type over an open radio channel not forming part of an established telecommunications network, to request transmission of accumulated data;

receiving means for receiving an instruction in the form of a second packet type from a receiving station if the transmitter is within the vicinity of said receiving station; and selection means for transmitting a portion of said accumulated data in response to said received instruction to allow instructions for data to be transmitted to other vehicles in the vicinity to facilitate a downloading of said accumulated data from a plurality of vehicles in the vicinity.

17. Apparatus as in claim 16, including position means for identifying the position of the vehicles and accumulating means for accumulating data representing said positions.

18. Apparatus as in claim 17, wherein said position means for generating positional data includes means for receiving radio signals from satellites.

19. Apparatus as in claim 16, including initiation means for initiating a transmission in response to the ignition of the vehicles being turned off.

20. Apparatus as in claim 16, wherein said accumulating means is operated in response to the vehicle ignition being turned on.

21. Apparatus as in claim 16, including randomizing means for transmitting said first packet type after a relatively random period so as to minimize the risk to vehicles transmitting data at the same time.

22. Apparatus as in claim 16, including detection means for detecting whether a radio channel is available prior to transmitting a packet of data.

23. Apparatus as in claim 16, including recording means for recording a unique address for the device.

24. Apparatus as in claim 16, including clearing means for clearing data accumulation memory in response to receiving an appropriate instruction from a processing station.

25. A receiving station for receiving accumulated data from a plurality of vehicles, wherein said data is accumulated by a vehicle during operation of said vehicle and relates to operational characteristics of a vehicle, said receiving station comprising:

receiving means for receiving a first packet type request from each vehicle via an open radio channel not forming part of an established telecommunications network;

transmitting means for transmitting an instruction for data in the form of a second packet type upon detecting said first packet type wherein said receiving means is arranged to receive portions of a predetermined size of said accumulated data from detected vehicles in response to said instructions to allow the downloading of accumulated data from a plurality of vehicles in the vicinity.

26. Apparatus as in claim 25, wherein said received data represents vehicle positions.

27. Apparatus as in claim 25, including a data collection point for receiving and transmitting radio signals and a data processing system for storing said received data.

28. Apparatus as in claim 25, including detection means for detecting whether a radio channel is available prior to transmitting instructions.

29. Apparatus as in claim 25, including identifying means for identifying unique addresses within received packets.

30. Apparatus as in claim 25, including clearing means for transmitting a packet instructing accumulation devices to clear storage memory.

31. Apparatus as in claim 25, including prioritizing means for prioritizing the accumulation of data from a plurality of accumulation devices.

32. Apparatus as in claim 31, wherein said prioritizing means includes means for giving priority to accumulate devices having relatively full memories.

33. A method of transferring accumulated vehicle data from each of plural vehicles when they are located in the local radio communication range of an open, limited range, terrestial radio channel transceiver, said method comprising:

transmitting a data download request from a vehicle over said open, limited range, terrestial radio channel to said transceiver in response to a predetermined vehicle state;

detecting said download request at transceiver site if a transmitting vehicle is located within the limited range of said transceiver site on said open terrestial radio channel; and transmitting a data download instruction to said vehicle from said transceiver site over said open terrestial radio channel if said download request is detected.

34. A method as in claim 33 wherein said data download requests are transmitted asynchronously from each of plural vehicles concurrently located within the limited range of said transceiver site over said open terrestial radio channel.

35. A method as in claim 34 wherein said download requests include download prioritization data used by a data processor at said transceiver site to send download instructions preferentially to one or more vehicles associated with higher prioritization data than are other vehicles then within radio range of the transceiver site.

36. A method as in claim 33 wherein a vehicle receiving a download instruction downloads only a predetermined portion of its accumulated vehicle data to be downloaded and thereafter transmits another data download request in competition with other vehicle download requests then possibly being transmitted by other vehicles within the limited radio communication range of said open terrestial radio channel.

* * * * *